United States Patent
Materné

[11] Patent Number: 5,918,372
[45] Date of Patent: Jul. 6, 1999

[54] RESCUE KNIFE, ESPECIALLY FOR SEAT BELTS

[75] Inventor: Olgierd Materné, Poznan, Poland

[73] Assignee: "Bras-Pol" Spolka Z O. O., Poznan, Poland

[21] Appl. No.: 08/765,995

[22] PCT Filed: Jul. 5, 1995

[86] PCT No.: PCT/PL95/00013

§ 371 Date: Jan. 2, 1997

§ 102(e) Date: Jan. 2, 1997

[87] PCT Pub. No.: WO96/01196

PCT Pub. Date: Jan. 18, 1996

[30] Foreign Application Priority Data

Jul. 6, 1994 [PL] Poland ..................................... 304186

[51] Int. Cl.$^6$ ..................................................... B26B 27/00
[52] U.S. Cl. ........................ 30/298.4; 280/801.1; 297/468
[58] Field of Search ............................. 30/298.4, 296.1, 30/294, DIG. 3; 280/801.1, 808; 297/468, 485

[56] References Cited

U.S. PATENT DOCUMENTS

| 4,371,192 | 2/1983 | Alix | 280/801 |
| 4,680,861 | 7/1987 | Meurer | 30/298.4 |

FOREIGN PATENT DOCUMENTS

| 0 070 439 | 1/1983 | European Pat. Off. . |
| 26 05 477 | 7/1977 | Germany . |
| 32 24 821 | 1/1984 | Germany . |
| 91 15 692 | 7/1993 | Germany . |
| 93 11 120 | 2/1994 | Germany . |

*Primary Examiner*—Douglas D. Watts
*Attorney, Agent, or Firm*—Collard & Roe, P.C.

[57] ABSTRACT

A rescue knife, the edge (1) of which is fixed in a slanted cutting slot (3) of a holder (2) with rounded corners, having a quick-released fastening unit, provided with an adjustment mechanism for suspension on the seat belt (6). The fastening unit may be formed of parallel guides (4, 5) integrated in the holder (2) and bevelled at their ends, and comprising two set bosses (7, 8) situated symmetrically on a part of their length to be used as the suspension adjustment mechanism.

3 Claims, 2 Drawing Sheets

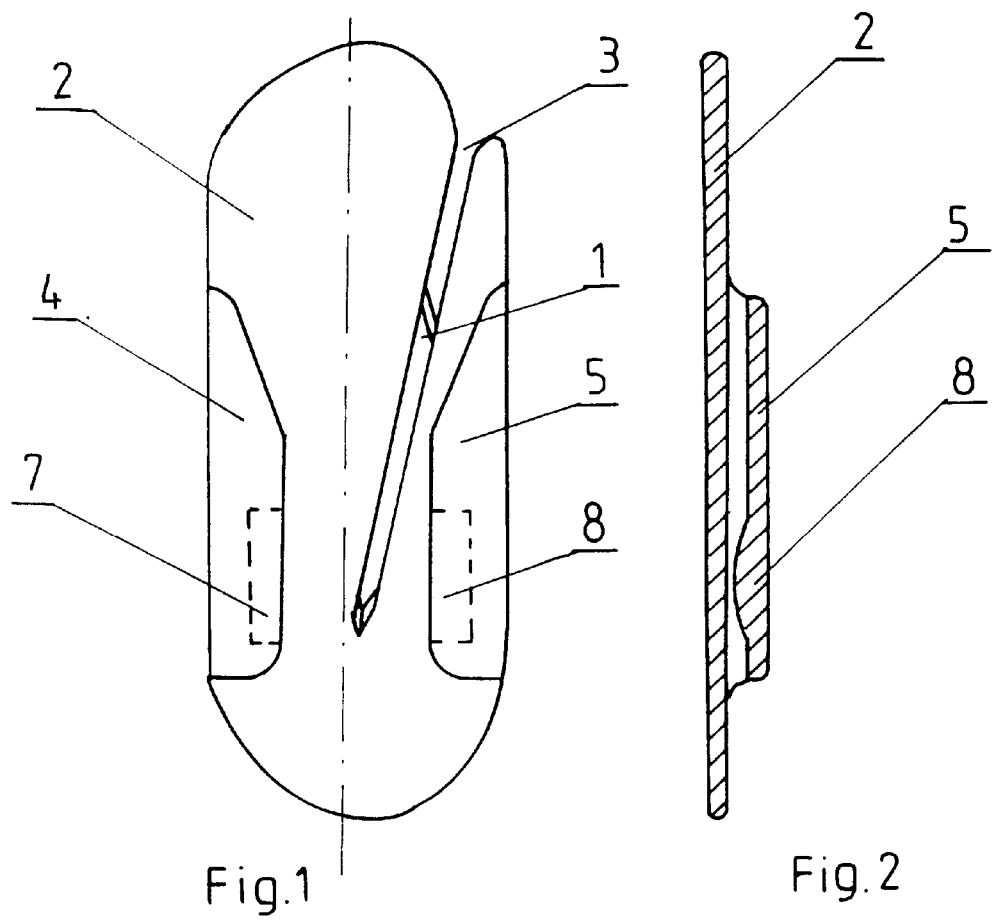
Fig.1
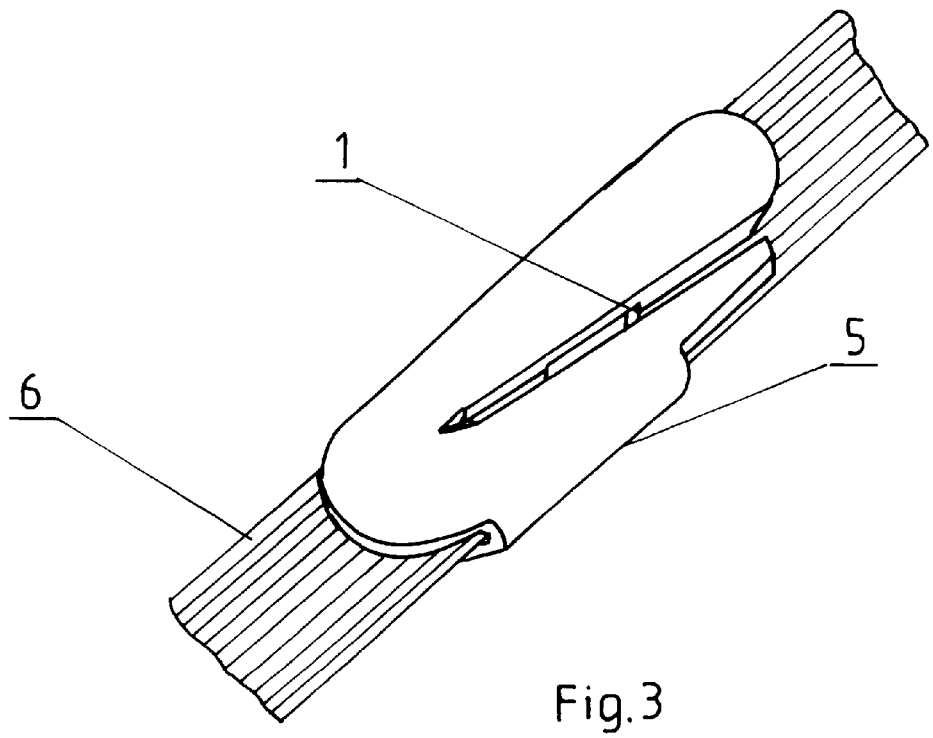
Fig.2
Fig.3

RESCUE KNIFE, ESPECIALLY FOR SEAT BELTS

BACKGROUND OF THE INVENTION

1. Field of the Invention

This invention relates to a rescue knife for seat belts. Seat belts can become locked in automotive vehicles after an accident and interfere with an injured person's escape. Therefore, rescue knives are important because they allow injured persons to free themselves after an accident.

2. Description of the Prior Art

The use of rescue knives for seat belts is known in the prior art. For example, German Patents 2605477, and 3224821 and European Patent 070439 disclose rescue knives with an immovable edge fixed in the cutting slot of a holder. These type holders have a grip shaped to adapt to a human palm.

These types of knives are stored in a glove compartment or can be hung on a hook and fastened to a car body, by means of an opening in the knife grip.

If the knife is not accessible, or not known to the occupants then there is an increased danger for these occupants if they are trapped in the seatbelts during an accident.

In addition, German utility model U 9115692 shows a seat belt mounted rescue knife. This rescue knife has a knife edge mounted in a slanted cutting slot that is in a holder having rounded corners. The knife is also provided with a fastening device in the form of a carriage mounted slidingly on a seat belt.

The present invention is an improvement over the prior art because it includes two set bosses located on the holder. The set bosses are designed to prevent the holder from sliding down the seat belt.

SUMMARY OF THE INVENTION

One object of the invention is to provide a cutting knife that is easy to access. Another object of the invention is to provide a knife mounting arrangement that allows for suspension height adjustment.

To achieve these objects, there is provided a rescue knife having an edge of constant cutting angle. The edge is fixed in a holder with a slanted cutting slot that has rounded corners. There is also provided a quick releasable fastening unit having a mechanism to adjust the suspension of seat height on the seat belt. The fastening unit consists of two parallel guides permanently joined with the holder. These guides are small in width, and spaced from each other across the width of the seat belt. Two set bosses are situated symmetrically on a part of length of the guides that are a suspension mechanism.

The guides should be monolithic holder elements in the form of symmetrical strips beveled symmetrically at least one end and situated above the holder.

In a second embodiment of the invention, the knife is housed in a quick releasable knife holder. This knife holder has a catch coaxial with the holder and connected permanently to it. In addition, secured to the seat belt is a channel seat belt clamp having a suspension height adjustment mechanism being a rotatable wedge with a grip. In this grip is a catch hole designed to receive the catch and hold the knife holder in place on the seat belt.

This invention enables a quick release suspension of a rescue knife on a seat belt in a well visible and accessible place. In addition, this device also allows the height adjustment of the holder on the seat belt to allow easy access to the knife.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views:

FIG. 1 is a view of the knife seen from the guide slide;

FIG. 2 is a cross-sectional view of the knife;

FIG. 3 is a perspective view of the knife situated on the seat belt;

DETAILED DESCRIPTION OF THE PREFERRED EMBODIMENT

Figure 4:
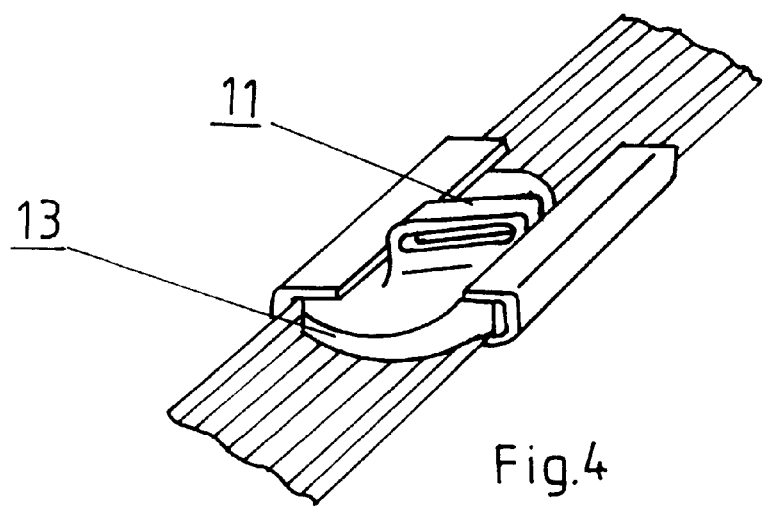
FIG. 4 is a perspective view of the channel clamp together with a rotatable wedge on the seat belt.

Referring to FIGS. 1, 2, and 3 the rescue knife consists of an edge 1 fixed in a holder 2 made of plastic at a constant angle of about 15°. Holder 2 has rounded corners and a slanted cutting slot 3. A pair of guides 4 and 5 are spaced apart to suit the width of the seat belt 6. Two set bosses 7 and 8 are formed within guides 4 and 5 respectively. Set bosses 7 and 8 create resistance which keeps the knife from sliding along the seat belt due to gravity or other forces. However, these set bosses 7 and 8 do allow a user to manually adjust the position of knife 1 on seat belt 6.

Figure 5:
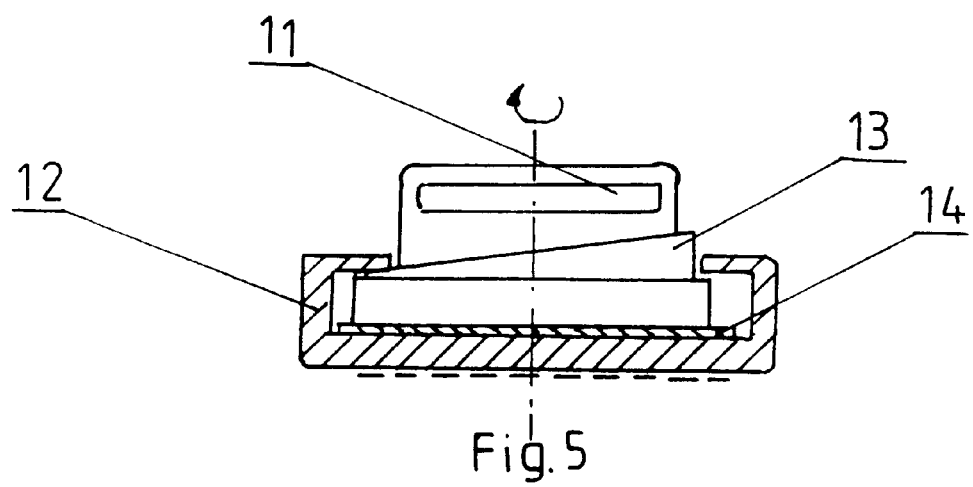
FIG. 5 is a cross section of the clamp.
Figure 6:
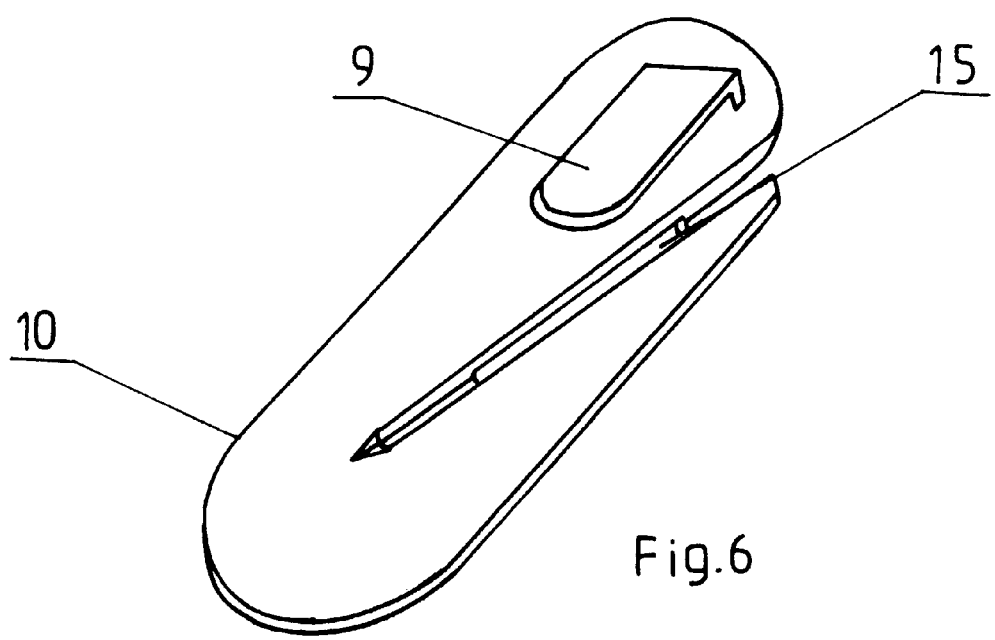
FIG. 6 is a perspective view of the knife from the catch side.

In an additional embodiment of the invention, the rescue knife shown in FIGS. 4, 5, and 6 comprises an edge 15 mounted on a holder 10 made of plastic. Holder 10 has rounded corners and a slanted cutting slot. There is also provided a single catch 9 connected coaxially with holder 10. Catch 9 fits inside rectangular hole 11. Rectangular hole 11 is placed on the grip of rotatable wedge 13. Rotatable wedge 13 serves to block the channel clamp 12 on seat belt 14.

Since these knives are readily adjustable on the seatbelt, they can be easily accessed during an accident. When a seat belt is permanently locked during an accident, a victim or rescue man releases the rescue knife and uses it to cut through the belt.

Accordingly, while two embodiments of the present invention have been shown and described, it is to be understood that many changes and modifications may be made thereunto without departing from the spirit and scope of the invention as defined in the appended claims.

I claim:

1. A rescue knife for seat belts comprising:
   (a) an edge positioned at a constant cutting angle;
   (b) a holder having a slanted cutting slot for receiving said edge;
   (c) two parallel guides permanently joined with said holder said guides spaced apart from each other across the width of the seat belt, wherein said guides form a quick releasable fastening unit; and
   (d) two set bosses situated symmetrically on a part of the length of said guides, wherein said set bosses form a suspension height adjustment mechanism allowing semi-permanent positioning of said knife on said seat belt.

2. A rescue knife as claimed in claim 1, wherein said guides are molded with said holder and are in the shape of strips beveled symmetrically at least at one end and positioned above said holder.

3. A rescue knife for seat belts comprising:

(a) an edge with a constant cutting angle;

(b) a holder having a slanted cutting slot with rounded corners for housing said edge;

(c) a catch permanently connected to said holder and positioned coaxially with said holder; and (d) a mechanism for the adjustment of suspension height on the seat belt, comprising:
   (i) a channel clamp positioned around the seat belt; and
   (ii) a rotatable wedge located within said channel clamp, said rotatable wedge having a grip and a catch hole for receiving said catch.

* * * * *